(12) United States Patent
Tosaka

(10) Patent No.: US 9,979,643 B2
(45) Date of Patent: May 22, 2018

(54) COMMUNICATION APPARATUS, COMMUNICATION METHOD, AND COMPUTER-READABLE RECORDING MEDIUM

(71) Applicant: Ryoh Tosaka, Kanagawa (JP)

(72) Inventor: Ryoh Tosaka, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 222 days.

(21) Appl. No.: 14/882,498

(22) Filed: Oct. 14, 2015

(65) Prior Publication Data
US 2016/0112315 A1    Apr. 21, 2016

(30) Foreign Application Priority Data

Oct. 20, 2014 (JP) .................................. 2014-213694

(51) Int. Cl.
| | |
|---|---|
| H04L 12/28 | (2006.01) |
| H04L 12/749 | (2013.01) |
| H04L 12/741 | (2013.01) |
| H04L 29/12 | (2006.01) |
| H04W 80/04 | (2009.01) |

(52) U.S. Cl.
CPC ............ H04L 45/741 (2013.01); H04L 45/54 (2013.01); H04L 61/6059 (2013.01); H04W 80/04 (2013.01)

(58) Field of Classification Search
None
See application file for complete search history.

(56) References Cited

U.S. PATENT DOCUMENTS

| | | | |
|---|---|---|---|
| 7,630,373 B2 | 12/2009 | Okuno | |
| 2004/0225750 A1* | 11/2004 | Lim | H04L 29/12009 709/245 |
| 2008/0253382 A1* | 10/2008 | Bachmann | H04W 8/04 370/400 |
| 2009/0024758 A1* | 1/2009 | Levy-Abegnoli | H04L 45/745 709/237 |
| 2012/0063334 A1* | 3/2012 | Drake | G06F 1/32 370/252 |
| 2013/0215810 A1 | 8/2013 | Wang et al. | |

(Continued)

FOREIGN PATENT DOCUMENTS

| | | |
|---|---|---|
| JP | 4556761 | 7/2010 |
| JP | 2014-500653 | 1/2014 |

*Primary Examiner* — Rebecca E Song
(74) *Attorney, Agent, or Firm* — Harness, Dickey & Pierce, P.L.C.

(57) ABSTRACT

A communication apparatus includes a first storage unit, a second storage, and a first registrator. The first storage stores at least a destination address representing an IPv6 address that is a destination of a packet and a next hop address representing an IPv6 address of a next hop representing the next destination to which the packet is transferred in association with each other. The second storage stores an IPv6 address of a default router to which the packet is transferred when it is not possible to determine the next hop address by using the first storage. When a second RA packet representing an RA packet other than first RA packets representing a RA packet for 6LowPAN is received, the first registrator registers an IPv6 address from which the second RA packet has been transmitted as an IPv6 address of the default router.

20 Claims, 10 Drawing Sheets

(56) References Cited

U.S. PATENT DOCUMENTS

2013/0282498 A1\* 10/2013 Korhonen ......... H04L 29/12018
　　　　　　　　　　　　　　　　　　　　705/14.73
2016/0174148 A1\* 6/2016 Seed ................. H04W 52/0216
　　　　　　　　　　　　　　　　　　　　370/311

\* cited by examiner

Next_Hop_IP[127:0]

Index=Next_Hop_IP[7:0]

COMMUNICATION APPARATUS, COMMUNICATION METHOD, AND COMPUTER-READABLE RECORDING MEDIUM

CROSS-REFERENCE TO RELATED APPLICATIONS

The present application claims priority to and incorporates by reference the entire contents of Japanese Patent Application No. 2014-213694 filed in Japan on Oct. 20, 2014.

BACKGROUND OF THE INVENTION

1. Field of the Invention

The present invention relates to a communication apparatus, a communication method, and a computer-readable recording medium.

2. Description of the Related Art

As a standard for performing IPv6 communications by using low-power personal area networks (6LoWPAN) according to IEEE802.15.4, IPv6 over Low power Wireless Personal Area Networks (6LoWPAN) has been defined.

For example, Japanese National Publication of International Patent Application No. 2014-500653 discloses an apparatus that performs communications according to 6LoWPAN.

For example, as for the specification of IPv6, it is required to set two or more default routers in a default router list that is used to determine, upon packet transmission, a next hop address (an IPv6 address of the next hop representing the next destination to which the packet is transferred). Upon packet transmission, when it is not possible to determine a next hop address with respect to a destination address corresponding to a transmission packet for transmission by using a destination cache representing a correspondence table between the destination address representing the IPv6 address that is a destination and a next hop address that was determined before or a known prefix list, a next hop address is determined from the default router list. The same series of processing operations is performed according to 6LoWPAN.

When a router for 6LoWPAN (a router that performs communications according to the 6LoWPAN standard) is registered in the default router list, however, a packet not for 6LoWPAN (a packet other than packets according to the 6LoWPAN standard) may be transmitted to the router. Accordingly, the packet that is originally not required to be transmitted is transmitted to the router for 6LoWPAN and the router wastes power to receive the packet that is originally not required to be received. This is particularly problematic in 6LoWPAN where low-power consumption is assumed.

SUMMARY OF THE INVENTION

It is an object of the present invention to at least partially solve the problems in the conventional technology.

According to the present invention, there is provided a communication apparatus including a plurality of communication interfaces, the communication apparatus comprising: a first storage that stores at least a destination address representing an IPv6 address that is a destination of a packet and a next hop address representing an IPv6 address of a next hop representing the next destination to which the packet is transferred in association with each other; a second storage that stores an IPv6 address of a default router to which the packet is transferred when it is not possible to determine the next hop address by using the first storage; and a first registrator that, when a second router advertisement packet representing an router advertisement packet other than first router advertisement packets representing a router advertisement packet for IPv6 over Low power Wireless Personal Area Networks is received, registers an IPv6 address from which the second router advertisement packet has been transmitted as an IPv6 address of the default router.

The present invention also provides a communication method comprising: when a second router advertisement packet representing an router advertisement packet other than first router advertisement packets representing a router advertisement packet for IPv6 over Low power Wireless Personal Area Networks is received, registering, in a second storage that stores an IPv6 address of a default router, an IPv6 address from which the second router advertisement packet has been transmitted as an IPv6 address of the default router to which a packet is transferred when it is not possible to determine a next hop address representing an IPv6 address of a next hop representing the next destination to which the packet is transferred by using a first storage that stores at least a destination address representing an IPv6 address that is a destination of the packet and the next hop address representing an IPv6 address of the next hop in association with each other.

The present invention also provides a non-transitory computer-readable recording medium that contains a computer program that causes a computer to execute: when a second router advertisement packet representing an router advertisement packet other than first router advertisement packets representing a router advertisement packet for IPv6 over Low power Wireless Personal Area Networks is received, registering, in a second storage that stores an IPv6 address of a default router, an IPv6 address from which the second router advertisement packet has been transmitted as an IPv6 address of the default router to which a packet is transferred when it is not possible to determine a next hop address representing an IPv6 address of a next hop representing the next destination to which the packet is transferred by using a first storage that stores at least a destination address representing an IPv6 address that is a destination of the packet and the next hop address representing an IPv6 address of the next hop in association with each other.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of the communication apparatus, the communication method, and the computer-readable recording medium containing a program according to the present invention will be described in detail below with reference to the accompanying drawings.

First Embodiment

Figure 1:
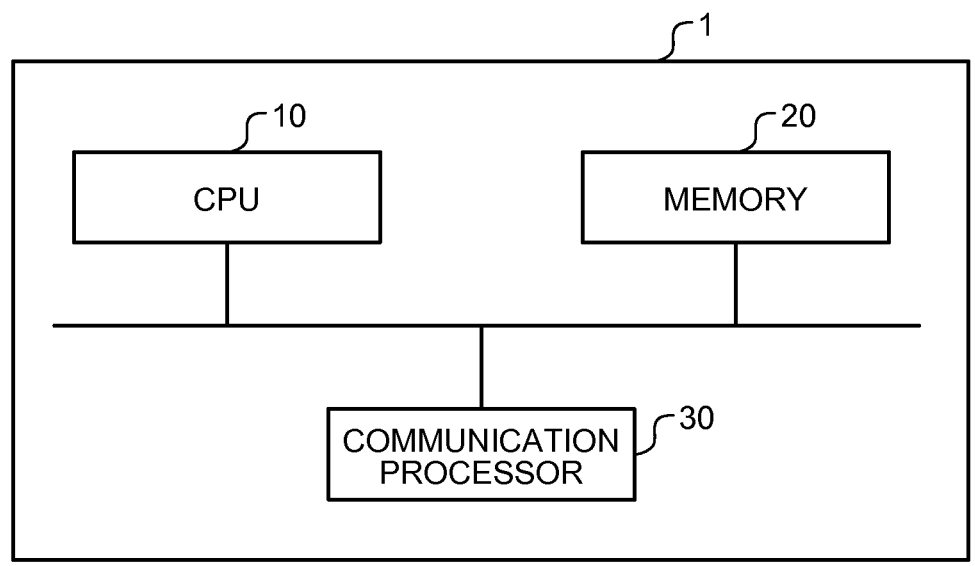
FIG. 1 is a diagram showing an exemplary hardware configuration of a communication apparatus according to a first embodiment of the present invention.

FIG. 1 is a diagram showing an exemplary hardware configuration of a communication apparatus 1 according to a first embodiment of the present invention. As shown in FIG. 1, the communication apparatus 1 includes a CPU 10, a memory 20, and a communication processor 30. The CPU 10 integrally controls operations of the communication apparatus 1. The memory 20 stores programs and various types of data. The communication processor 30 executes processes on communications under the control of the CPU 10.

Figure 2:
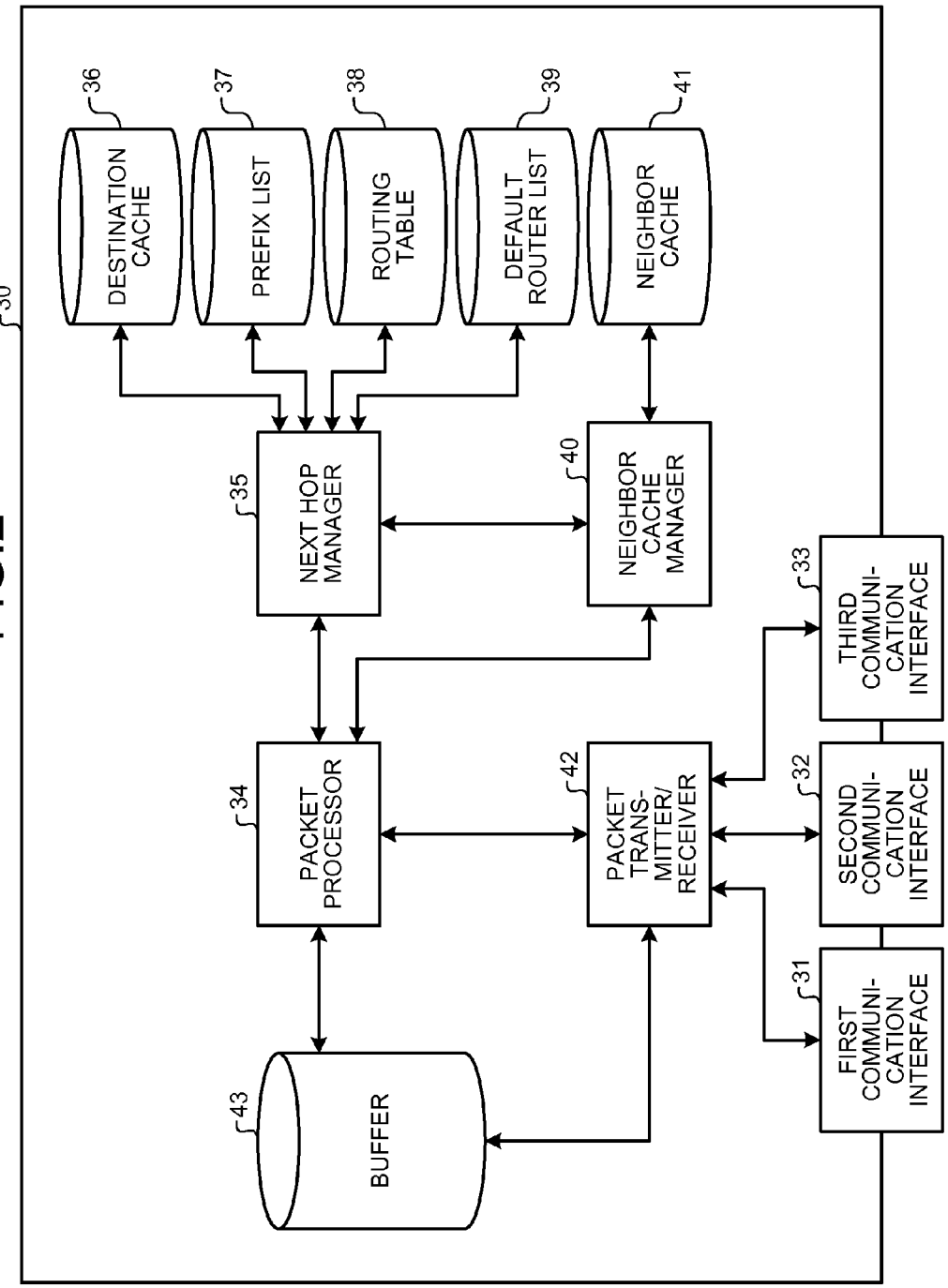
FIG. 2 is a diagram showing an exemplary hardware configuration of a communication processor according to the first embodiment.

FIG. 2 is a diagram showing an exemplary hardware configuration of the communication processor 30. According to the example shown in FIG. 2, the communication processor 30 includes three communication interfaces (a first communication interface 31, a second communication interface 32, and a third communication interface 33) and the first communication interface 31 corresponds to IEEE802.15.4, the second communication interface 32 corresponds to Ethernet, and the third communication interface 33 corresponds to Wireless Fidelity (Wi-Fi). When the first communication interface 31, the second communication interface 32, and the third communication interface 33 are not distinguished from one another, they may be simply referred to as "communication interfaces" below.

As shown in FIG. 2, the communication processor 30 includes a packet processor 34, a next hop manager 35, a destination cache 36, a prefix list 37, a routing table 38, a default router list 39, a neighbor cache manager 40, a neighbor cache 41, a packet transmitter/receiver 42, and a buffer 43.

First, the functions of the respective units implemented when the communication processor 30 generates a packet for transmission (that may be referred to as a "transmission packet" below) and transmits the packet will be described. The packet processor 34 generates a transmission packet. According to the example, it can be considered that the packet processor 34 serves as the "generator" according to the claims. The packet processor 34 saves the generated transmission packet in the buffer 43, notifies the next hop manager 35 of a destination address representing an IPv6 address that is a destination of the transmission packet and of for which communication interface the packet is (a communication interface to be used), and requests the next hop manager 35 to determine a next hop address (the IPv6 address of the next hop representing the next destination to which the packet is transferred) with respect to the destination address corresponding to the transmission packet.

The next hop manager 35 is capable of, upon receiving the request for determining the next hop address from the packet processor 34, determining whether the transmission packet is a transmission packet for 6LoWPAN (a transmission packet according to the 6LoWPAN standard) on the basis of a communication interface that is notified as a communication interface to be used by the packet processor 34. According to this example, it is possible to determine that the transmission packet is a transmission packet for 6LoWPAN when the communication interface notified by the packet processor 34 is the first communication interface 31, and determine that the transmission packet is not a transmission packet for 6LoWPAN when the communication interface is the second communication interface 32 or the third communication interface 33.

According to the following explanation, a transmission packet for 6LoWPAN may be referred to as a "first transmission packet", a transmission packet not for 6LoWPAN may be referred to as a "second transmission packet", and, when they are not distinguished, a transmission packet may be simply referred to as a "transmission packet". Methods of determining whether a transmission packet is for 6LoWPAN is not limited to the above-described method, and various methods may be employed.

When the next hop manager 35 determines that the transmission packet is a transmission packet for 6LoWPAN (i.e., when the packet processor 34 generates a first transmission packet), the next hop manager 35 refers to the routing table 38 and determines a next hop address with respect to the destination address corresponding to the first transmission packet. The routing table 38 stores at least a destination address and a next hop address in association with each other. The routing table 38 according to this example corresponds to the "first storage" according to the claims.

Figure 3:
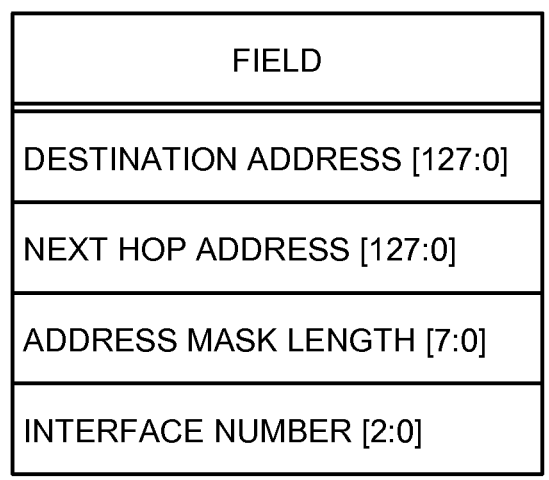
FIG. 3 is a diagram showing an exemplary configuration of a routing table.

FIG. 3 is a diagram showing an exemplary configuration of the routing table 38 where the minimum field consists of a destination address, a next hop address, an address mask length, and an interface number that identifies a communication interface. According to the example, each destination address and each next hop address consists of 128 bits. The address mask length specifies a bit length to be searched for in the destination address. According to the example shown in FIG. 3, the address mask length consists of information of 8 bits (that is an example only and does not limit address mask length) and, when the address mask length represents "64" in decimal, the upper 64 bits of the destination address are to be searched for.

When a communication interface for transmission packets is specified, the interface number is used for comparison with the specified communication interface and, according to the example shown in FIG. 3, the interface number consists of 2 bits. For example, a mode may be employed where bits (an interface number) representing "0" in decimal represents the first communication interface 31, bits representing "1" in decimal represents the second communication interface 32, and bits representing "2" in decimal represents the third communication interface 33. With the routing table 38, it is possible to manage, in addition to the above described minimum field, the number of via routers, transmission delay, etc. Practically, there is a valid/invalid setting of whether to search the interface number in the routing table 38 to determine the next hop. Because it is necessary to make that setting per transmission packet, for example, a method of communicating the valid/invalid setting to communicate the interface number to each manager may be employed. Alternatively, a method of making the valid/invalid setting in association with a transmission packet (including a header and data) may be employed. When referring to the packet in the buffer 43, a manager can refer to the valid/invalid setting and the interface number together.

FIG. 2 will be referred back here. A method performed by the next hop manager 35 to determine a next hop address when the next hop manager 35 determines that the transmission packet is not a transmission packet for 6LoWPAN will be described. According to the first embodiment, each time the next hop manager 35 determines a next hop address with respect to the destination address corresponding to a transmission packet not for 6LoWPAN (a second transmission packet), the next hop manager 35 stores the destination address corresponding to the second packet and the determined next hop address in association with each other in the destination cache 36. The destination cache 36 according to this example corresponds to the "third storage" according to the claims. The details of the method of determining a next hop address with respect to a destination address corresponding to a second transmission packet will be described below.

First, by using the destination cache 36, the next hop manager 35 determines a next hop address with respect to the destination address corresponding to the second transmission packet. More specifically, when a destination address that matches the destination address corresponding to the second transmission packet is in the destination cache 36, the next hop manager 35 determines, as the next hop address with respect to the destination address corresponding to the second transmission packet, the next hop address associated with the destination address matching the destination address corresponding to the second transmission packet. On the other hand, when no destination address matching the destination address corresponding to the second transmission packet is in the destination cache 36, the next hop manager 35 determines a next hop address with respect to the destination address corresponding to the second transmission packet by using the prefix list 37.

The prefix list 37 stores at least a prefix of a link local address (that may be referred to as a "local prefix"). The link local address is an address that is valid only in a link (a communication line connecting nodes) to which a node (the communication apparatus 1) is directly connected. For example, the prefix list 37 stores a global address in addition to the link local address, and it is possible to, with respect to each of the link local address and the global address, set an On-Link flag representing that the prefix (information for identifying the network) is on the link. The prefix list 37 according to this example corresponds to the "fourth storage" according to the claims.

When the prefix (represented by the top 64 bits of the destination address) for identifying the network that is contained in the destination address corresponding to the second transmission packet and the local prefix stored in the prefix list 37 match and the On-Link flag is set, the next hop manager 35 determines the destination address corresponding to the second transmission packet as the next hop address. On the other hand, when the prefix contained in the destination address corresponding to the second transmission packet and the local prefix stored in the prefix list 37 do not match, or when the On-Link flag is not set, the next hop manager 35 determines a next hop address with respect to the destination address corresponding to the second transmission packet by using the routing table 38.

A method of determining a next hop address by using the routing table 38 is as follows. When a destination address that matches the destination address corresponding to the second transmission packet is in the routing table 38, the next hop manager 35 determines, as a next hop address with respect to the destination address corresponding to the second transmission packet, the next hop address associated with the destination address matching the destination address corresponding to the second transmission packet. On the other hand, when no destination address matching the destination address corresponding to the second transmission packet is in the routing table 38, the next hop manager 35 determines, as a next hop address with respect to the destination address corresponding to the second transmission packet, an IPv6 address of a default router stored in the default router list 39.

The default router list 39 stores an IPv6 address of a default router to which the packet is to be transferred when it is not possible to determine a next hop address by using the routing table 38. The default router list 39 according to this example corresponds to the "second storage" according to the claims. According to the method of selecting a IPv6 address of a default router from the default router list 39, a IPv6 address of a router regarding which the state of the neighbor cache 41, which will be described below, is not INCOMPLETE is preferentially selected and, when there is no such router, an IPv6 address of any router is selected by using the round robin system (system in which all entries are selected according to a given order). The default router list 39 has to have IPv addresses of at last two default routers.

This is the method of determining a next hop address taken by the next hop manager 35. The next hop manager 35 according to the first embodiment corresponds to the "first determiner" according to the claims.

The next hop manager 35 notifies each of the packet processor 34 and the neighbor cache manager 40 of the next hop address that is determined as described above. The neighbor cache manager 40 having received this notification refers to the neighbor cache 41 in which at least an IPv6 address and a link layer address representing the physical address of the device (corresponding to a MAC address according to IPv4) and determines a link layer address associated with the IPv6 address that matches the next hop address determined by the next hop manager 35. The neighbor cache 41 according to this example corresponds to the "fifth storage" according to the claims. The neighbor cache manager 40 notifies the packet processor 34 of the determined link layer address.

The packet processor 34 reflects the next hop address with respect to the destination address corresponding to the transmission packet in the transmission packet and passes, to the packet transmitter/receiver 42, the packet top address and the packet length in the buffer 43 in which the transmission packet is saved. The packet transmitter/receiver 42 receives the packet from the buffer 43 and transmits the packet from a communication interface corresponding to the type of the packet. According to the example, it can be considered that the packet processor 34 performs control to transmit the transmission packet by using a link layer address that is determined by the neighbor cache manager 40, it can be considered that the combination of the packet processor 34 and the packet transmitter/receiver 42 performs control to transmit the transmission packet by using a link layer address that is determined by the neighbor cache manager 40, or it can be considered that the packet transmitter/receiver 42 performs control to transmit the transmission packet by using a link layer address that is determined by the neighbor cache manager 40.

In short, it can be considered that the packet processor 34 corresponds to the "transmission controller" according to the claims, it can be considered that the combination of the packet processor 34 and the packet transmitter/receiver 42 corresponds to the "transmission controller" according to the claims, or it can be considered that the packet transmitter/receiver 42 corresponds to the "transmission controller" according to the claims.

The functions of the respective units implemented when the communication processor 30 receives a packet will be described here. When the communication processor 30 receives a packet, the packet transmitter/receiver 42 saves the packet (that may be referred to as a "reception packet" below) in the buffer 43 and passes, to the packet processor 34, a packet top address, a packet length, and an interface number in the buffer 43 in which the reception packet is saved. The packet processor 34 communicates the information (the interface number, the IP address, the link layer address, and option information) of the received packet to the next hop manager 35 and the neighbor cache manager 40, and the next hop manager 35 and the neighbor cache manager 40 properly register a cache from the information.

The case will be exemplified below where a router advertisement (RA) packet that is used to automatically set an address according to IPv6. A RA packet for 6LoWPAN may be referred to as a "first RA packet", and a RA packet other than RA packets according to 6LoWPAN may be referred to as a "second RA packet". According to the first embodiment, when a second RA packet is received, the next hop manager 35 registers the IPv6 address from which the second RA packet has been transmitted in the default router list 39 as an IPv6 address of a default router. In other words, when a first RA packet is received, the next hop manager 35 does not register the IPv6 address from which the first RA packet has been transmitted in the default router list 39. The next hop manager 35 according to this example corresponds to the "first registrator" according to the claims.

For example, the information of the reception packet communicated from the packet processor 34 contains information that identifies the type of the packet and, by referring to the information, the next hop manager 35 can determine whether the received RA packet is a second RA packet or a first RA packet. Methods of determining whether a received RA packet is a second RA packet or a first RA packet are not limited to this. For example, the next hop manager 35 may determine whether the received RA packet is a second RA packet or a first RA packet from the interface number that is contained in the information of the received packet communicated from the packet processor 34. According to the example, it may be determined that the received RA packet is a first RA packet when the interface number represents the first communication interface 31 corresponding to the IEEE802.15.4, and it may be determined that the received RA packet is a second RA packet when the interface number represents the second communication interface 32 or the third communication interface 33 not corresponding to the IEEE802.15.4.

When a first RA packet (a first RA packet in which the router valid period is not zero) is received, the next hop manager 35 performs registration in the routing table 38. More specifically, when a first RA packet is received, the next hop manager 35 registers the IPv6 address from which the first RA packet has been transmitted as a next hop address in the routing table 38. More specifically, the IPv6 address from which the first RA packet has been transmitted may be registered as a destination address and a next hop address in the routing table and the IPv6 address from which the first RA packet has been transmitted may be registered as a default router for 6LowPAN in the routing table 38.

Registration in the routing table 38 for 6LowPAN is performed upon, in addition RA packet reception, reception of neighbor advertisement (NA), reception of Redirect, reception of IPv6, etc. For example, upon receiving NA as a response to neighbor solicitation (NS) transmission, the next hop manager 35 can register the IPv6 address from which the NA has been transmitted as a next hop address. When a router that receives a packet knows a much proper next hop, a redirect message is transmitted to notify the node from which the packet has been transmitted of the next hop. The next hop manager 35 can register, as a next hop address, the IP address of the proper next hop notified by the received redirect message. Furthermore, when a packet according to 6LoWPAN is received from a host of a link local (a link to which the communication apparatus 1 is directly connected), the next hop manager 35 can register, as a next hop address, the IP address from which the packet has been transmitted.

Furthermore, when a first RA packet is received, the next hop manager 35 registers a global prefix that identifies a global network that is specified by the first RA packet in the prefix list 37. Similarly, when a second RA packet is received, the next hop manager 35 registers a global prefix that identifies a global network specified by the second RA packet in the prefix list 37.

According to the embodiment, when a first RA packet is received, the neighbor cache manager 40 registers the IPv6 address from which the first RA packet has been transmitted and the link layer address from which the first RA packet has been transmitted in association with each other in the neighbor cache 41. For example, the information of the reception packet communicated from the packet processor 34 contains, in addition to information that identifies the type of the packet, an interface number representing the communication interface having received the packet. When a first RA packet is received, the neighbor cache manager 40 may also register, in the neighbor cache 41, the IPv6 address from which the first RA packet has been transmitted, the link layer address from which the first RA packet has been transmitted, and the interface number representing the communication interface having received the first RA packet in association with each other.

Furthermore, when a second RA packet is received, the neighbor cache manager 40 registers at least the IPv6 address from which the second RA packet has been transmitted and the link layer address from which the second RA packet has been transmitted in association with each other in the neighbor cache 41. Similarly to the case where a first RA packet is received, when a second RA packet is received, the neighbor cache manager 40 may register the IPv6 address from which the second RA packet has been transmitted, the link layer address from which the second RA packet has been transmitted, and an interface number representing a communication interface having received the second RA packet in association with each other in the neighbor cache 41. The neighbor cache manager 40 according to this example corresponds to the "second registrator" according to the claims.

This is the detailed configuration of the communication processor 30. The destination cache 36, the prefix list 37, the routing table 38, the default router list 39, the neighbor cache 41, and the buffer 43 may be provided as separate memories or may be provided in a single memory.

Furthermore, a mode may be employed where at least part of the functions of the packet processor 34, the next hop manager 35, the neighbor cache manager 40, and the packet transmitter/receiver 42 is implemented by the CPU 10 of the communication apparatus 1 by executing a program. The functions according to the invention from among the functions of the communication processor 30 are mainly described herein; however, functions of the communication processor 30 are not limited to them. For example, the communication processor 30 may perform a check sum calculation on a transmission/reception packet, may discard the packet when the check sum does not match, may add, edit, and remove the header as required, and may establish a TCP session. In other words, partly in cooperation with software, the communication processor 30 is capable of implementing functions of a transport layer and a network layer of an OSI-referred model.

Figure 4:
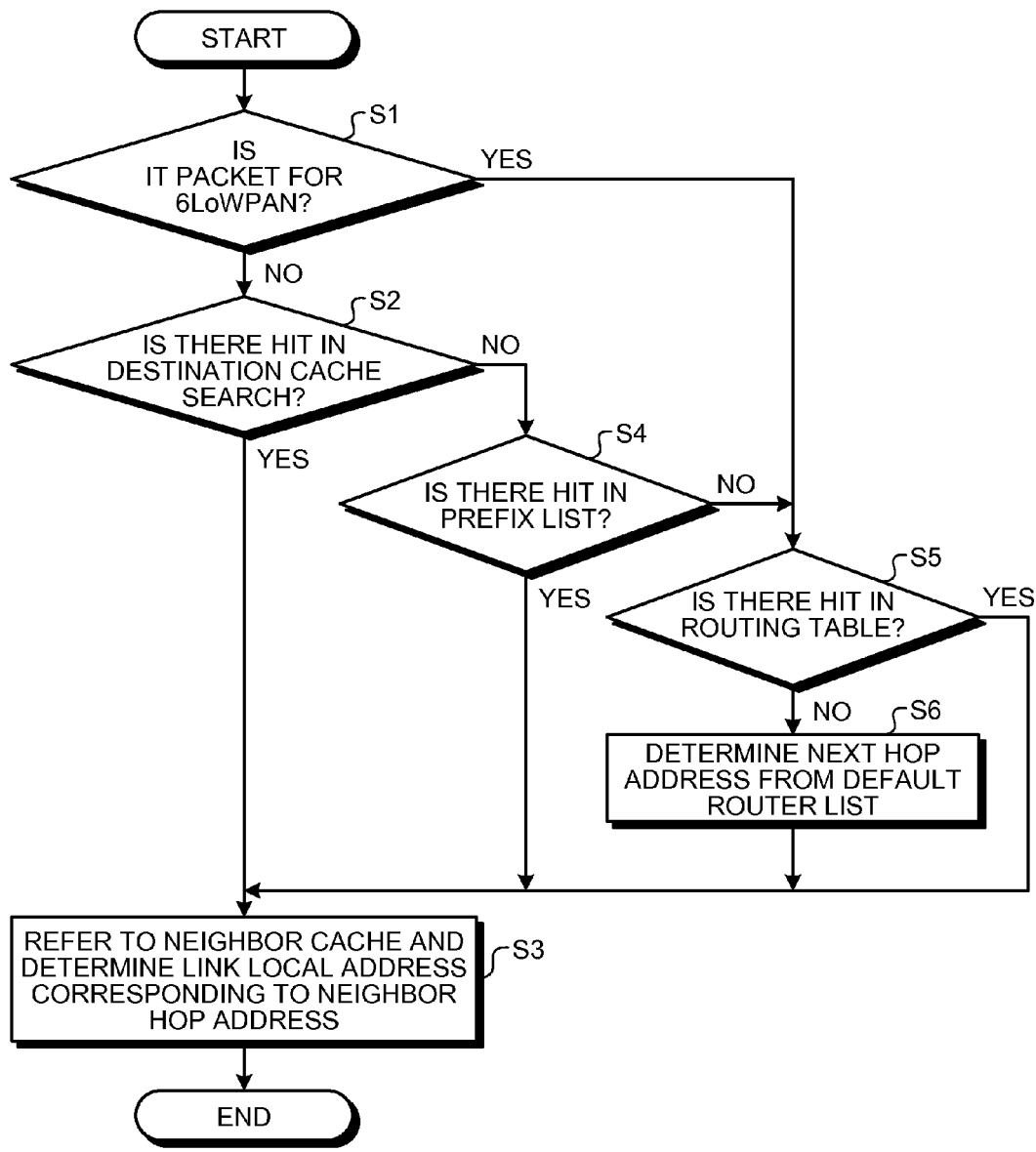
FIG. 4 is a flowchart showing exemplary operations of the communication processor upon packet transmission.

FIG. 4 is a flowchart showing exemplary operations of the communication processor 30 (the communication apparatus 1) to determine a next hop address with respect to a destination address corresponding to a transmission packet. When a transmission packet is not a transmission packet for 6LoWPAN (NO at step S1), i.e., when a transmission packet is a second transmission packet, the next hop manager 35 determines whether a destination address that matches a destination address corresponding to the second transmission packet is in the destination cache 36 (step S2). When a destination address that matches the destination address corresponding to the second transmission packet is in the destination cache 36 (YES at step S2), the next hop manager 35 determines, as a next hop address with respect to the destination address corresponding to the second transmission packet, a next hop address associated with the destination address matching the destination address corresponding to the second transmission packet and notifies the neighbor cache manager 40 of the determined next hop address. The neighbor cache manager 40 having received the notification refers to the neighbor cache 41 and determines a link local address associated with an IPv6 address that matches the next hop address that is determined by the next hop manager 35 (step S3). The following processing is as described above.

At step S2, when there is no destination address matching the destination address corresponding to the second transmission packet in the destination cache 36 (NO at step S2), the next hop manager 35 determines whether there is a hit of a prefix contained in the destination address corresponding to the second transmission packet in the prefix list 37 (step S4). As described above, when the prefix contained in the destination address corresponding to the second transmission packet and a local prefix stored in the prefix list 37 match, an On-Link flag is set, and there is a hit of the prefix in the prefix list 37 (YES at step S4), the next hop manager 35 determines the destination address corresponding to the second transmission packet as the next hop address and notifies the neighbor cache manager 40 of the determined next hop address. The following processing is as described above.

At step S4, when there is no hit of the prefix contained in the destination address corresponding to the second transmission packet in the prefix list 37 (NO at step S4), the next hop manager 35 determines whether a destination address that matches the destination address corresponding to the second transmission packet is in the routing table 38 (step S5). When a destination address that matches the destination address corresponding to the second transmission packet is in the routing table 38 (YES at step S5), the next hop manager 35 determines, as a next hop address with respect to the destination address corresponding to the second transmission packet, a next hop address associated with the destination address matching the destination address corresponding to the second transmission packet and notifies the neighbor cache manager 40 of the determined next hop address. The following processing is as described above.

At step S5, when no destination address matching the destination address corresponding to the second transmission packet is in the routing table 38 (NO at step S5), the next hop manager 35 determines, as a next hop address with respect to the destination address corresponding to the second transmission packet, an IPv6 address of a default router that is stored in the default router list 39 (step S6) and notifies the neighbor cache manager 40 of the determined next hop address. The following processing is as described above. When an IPv6 address of the default router is not registered in the default router list 39, the next hop manager 35 may determine the destination address corresponding to the second transmission packet as a next hop address.

As described above, because, when an RA packet according for 6LoWPAN (a first RA packet) is received, the next hop manager 35 does not register the IPv6 address from which the first RA packet is transmitted in the default router list 39, it is possible to prevent a packet not for 6LowPAN from being transmitted to a router corresponding to 6LoW-PAN.

On the other hand, when a transmission packet is a transmission packet for 6LowPAN (YES at step S1), i.e., when a transmission packet is a first transmission packet, the next hop manager 35 refers to the routing table 38 and determines whether a destination address that matches a destination address corresponding to the first transmission packet is in the routing table 38 (step S5). The next hop manager 35 determines, as a next hop address with respect to the destination address corresponding to the first transmission packet, a next hop address associated with the destination address matching the destination address corresponding to the first transmission packet. The following processing is as described above.

Figure 5:
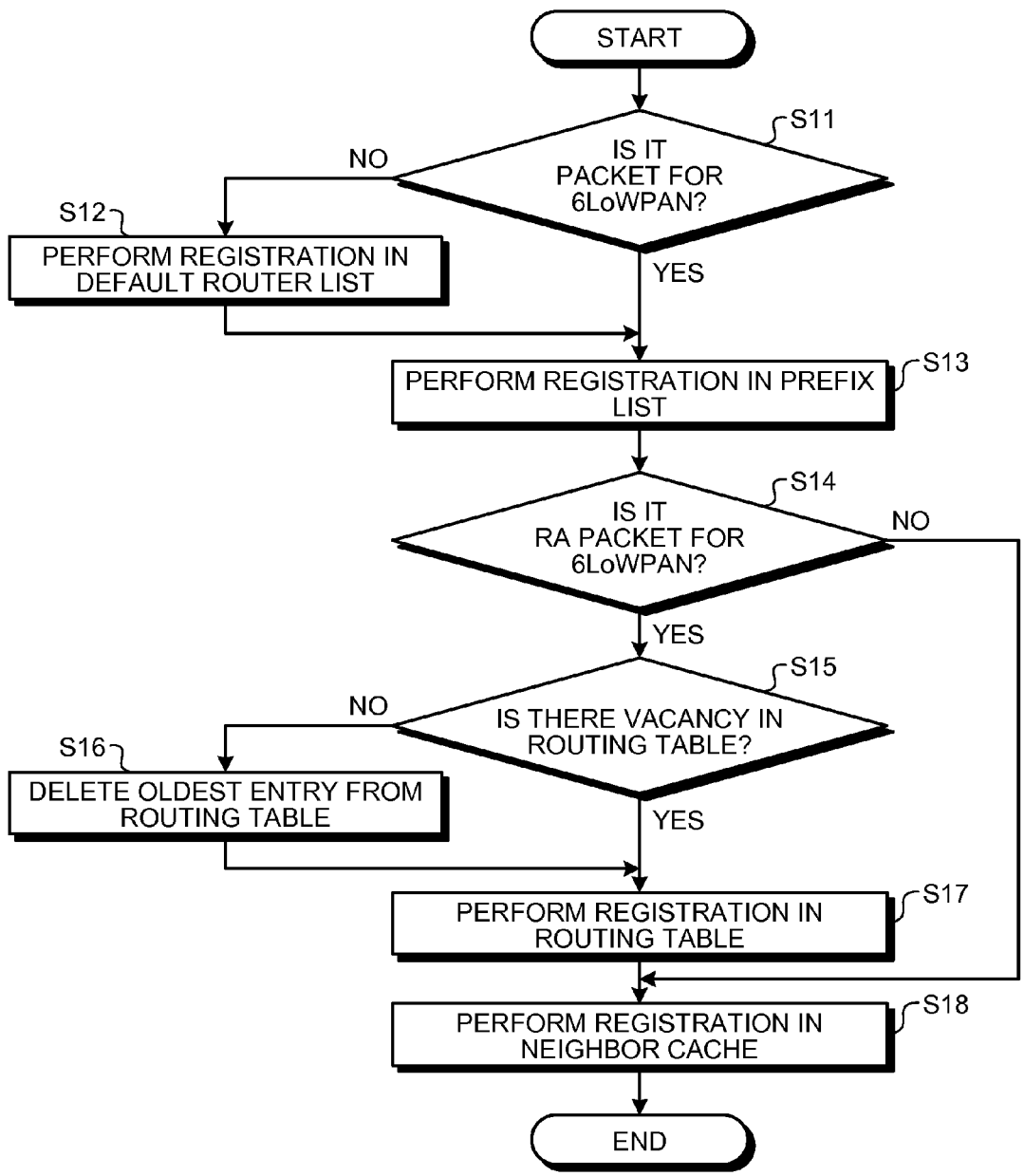
FIG. 5 is a flowchart showing exemplary operations of the communication processor upon reception of a RA packet.

FIG. 5 is a flowchart showing exemplary operations of the communication processor 30 (the communication apparatus 1) upon reception of a RA packet. When a received RA packet is not a RA packet for 6LoWPAN (first RA packet) (NO at step S11), i.e., when a received packet is a second RA packet, the next hop manager 35 registers an IPv6 address from which the second RA packet is transmitted as an IPv6 address of a default router in the default router list 39 (step S12). When registering an IPv6 address in the default router list 39, if the same address has been already registered, the next hop manager 35 updates the period in which the router may be used as a default router (a router valid period contained in the RA packet). If an RA packet in which the valid period is zero is received and an IPv6 address from which the RA packet has been transmitted is registered in the default router list 39, that registration is deleted. For prefix option, there is also a valid period (period in which the prefix can be used for On-Link determination) and the local prefix is constantly on-link. The next hop manager 35 then registers a global prefix that is specified by the second RA packet in the prefix list 37 (step S13).

On the other hand, when a received RA packet is a RA packet for 6LoWPAN (a first RA packet) (YES at step S11), the next hop manager 35 does not register an IPv6 address from which the first RA packet has been transmitted as an IPv6 address of a default router in the default router list 39 and registers a global prefix specified by the first RA packet in the prefix list 37 (step S13).

When a received RA packet is a RA packet for 6LoWPAN (YES at step S14), the next hop manager 35 determines whether there is a vacancy in the routing table 38 (step S15). When there is no vacancy in the routing table (NO at step S15), the next hop manager 35 deletes the oldest entry in the routing table 38 (step S16). According to this example, in order to determine the oldest entry, the next hop manager 35 manages the "time of registration" with respect to each entry in the routing table 38 and, when an entry is used, the "time of registration" of the entry is updated with the "time of use" of the entry. The oldest entry with the oldest "time of registration" from among multiple entries in the routing table 38 is selected as an entry to be deleted. Similarly, as for other caches, such as the neighbor cache 41, the oldest entry may be deleted when there is no vacancy.

When there is a vacancy in the routing table 38 (YES at step S15), or after step S16, the next hop manager 35 registers an IPv6 address from which the first RA packet has been transmitted in the routing table 38 (step S17). As described above, the next hop manager 35 registers an IPv6 address from which a first RA packet has been transmitted as a next hop address in the routing table 38.

After step S17, the neighbor cache manager 40 performs registration in the neighbor cache 41 (step S18). As described above, when a received RA packet is a first RA packet, the neighbor cache manager 40 registers at least an IPv6 address from which the first RA packet has been transmitted and a link layer address from which the first RA packet has been transmitted in association with each other in the neighbor cache 41.

On the other hand, when a received RA packet is not a RA packet for 6LoWPAN (NO at step S14), i.e., when a received RA packet is a second RA packet, registration in the routing table 38 is not performed and the neighbor cache manager 40 performs registration in the neighbor cache 41 (step S18). As described above, when a received RA packet is a second RA packet, the neighbor cache manager 40 registers at least an IPv6 address from which the second RA packet has been transmitted and a link layer address from which the second RA packet has been transmitted in association with each other in the neighbor cache 41.

According to this example, when a received RA packet is a second RA packet, registration in the routing table 38 is not performed. Alternatively, for example, in order to deal with a case where the next hop address is to be specified per communication interface or a case where the destinations of multiple nodes are to be put together into a single next hop address corresponding to a prefix (specifically, the bit part defined by the address mask length), a mode may be employed where, even when a received RA packet is a second RA packet, registration in the routing table 38 is performed.

Figure 6:
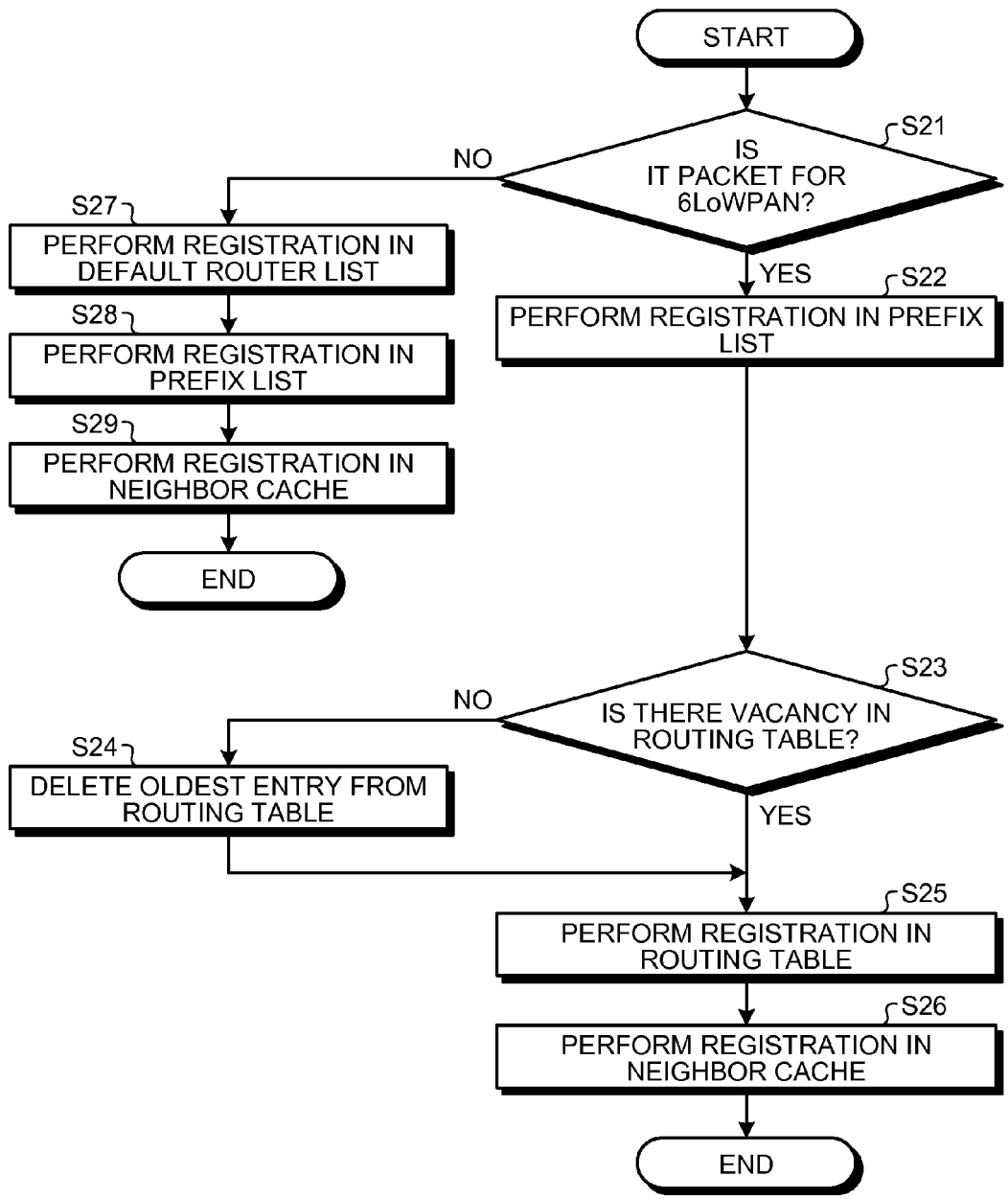
FIG. 6 is a flowchart showing exemplary operations of a variation of the communication processor upon reception of a RA packet.

FIG. 6 is a flowchart showing exemplary operations of a variation of the communication processor (the communication apparatus 1) upon reception of a RA packet. According to the example shown in FIG. 6, when a received RA packet is an RA packet for 6LoWPAN (first RA packet) (YES at step S21), the next hop manager 35 registers a global prefix specified the first RA packet in the prefix list 37 (step S22). The next hop manager 35 then determines whether there is a vacancy in the routing table 38 (step S23). When there is no vacancy in the routing table 38 (NO at step S23), the next hop manager 35 deletes the oldest entry in the routing table 38 (step S24). When there is a vacancy in the routing table (YES at step S23), or after step S24, the next hop manager 35 performs registration in the routing table 38 (step S25). After step S25, the neighbor cache manager 40 performs registration in the neighbor cache 41 (step S26).

On the other hand, when a received RA packet is not an RA packet for 6LoWPAN (NO at step S21), i.e., when the received packet is a second RA packet, the next hop manager 35 registers an IPv6 address from which the second RA packet has been transmitted as an IPv6 address of a default router in the default router list 39 (step S27). The next hop manager 35 then registers a global prefix specified by the second RA packet in the prefix list 37 (step S28). After step S28, the neighbor cache manager 40 performs registration in the neighbor cache 41 (step S29).

As described above, according to the first embodiment, only when a RA packet (a second RA packet) other than RA packets according to 6LoWPAN (first RA packets) is received, an IPv6 address from which the second RA packet has been transmitted is registered as an IPv6 address of a default router in the default router list 39. In other words, when a RA packet of 6LoWPAN (first RA packet) is received, an IPv6 address from which the first RA packet has been transmitted is not registered in the default router list 39. Accordingly, even when a next hop address with respect to a destination address corresponding to a transmission packet (a second transmission packet) not for 6LoWPAN is not explicitly in the routing table 38 and an IPv6 address of a default router registered in the default router list 39 is determined as a next hop address, an IPv6 address of a router for 6LoWPAN is not determined as a next hop address. Accordingly, determination of a next hop address upon packet transmission enables prevention of a packet not for 6LoWPAN from being transmitted to a router for 6LoW-PAN.

For example, for the above-described method of determining a next hop address by using the destination cache 36, the prefix list 37, or the default router list 39, a configuration implemented by using only the above-described routing table 38, i.e., a configuration in which determination of a next hop address is implemented by using only the routing table 38 may be considered; however, in consideration of the number of fields, the number of entries, and the cost of search by the CPU, this configuration is a bottle neck for communication apparatuses for 6LoWPAN for which a small memory space and a low-performance CPU are assumed.

On the contrary, according to the first embodiment, separately from the routing table 38, the destination cache 36, the prefix list 37, and the default router list 39 are provided. When a next hop address with respect to a destination address corresponding to a transmission packet not for 6LoWPAN is determined, first, a next hop address is determined by using the destination cache 36 and, when it is not possible to determine a next hop address by using the destination cache 36, a next hop address is determined by using the prefix list 37. When it is not possible to determine a next hop address by using the prefix list 37, a next hop address is determined by using the routing table 38 and, when it is not possible to determine a next hop address by using the routing table 38, a next hop address is determined by using the default router list 39 at last.

A configuration of implementing determination of a next hop address by using only the routing table 38, for example, requires an entry of a value representing invalidity in a field unnecessary for management of an IPv6 address of a default router, which unnecessarily increases the amount of information in the routing table 38. On the contrary, according to the first embodiment, because only necessary information is stored in each field in the routing table 38 and it is not required to store a value representing invalidity, compared to the configuration in which determination of a next hop address is implemented by using only the routing table 38, it is possible to reduce the memory capacity of the routing table 38 and also to reduce the whole memory capacity.

Second Embodiment

Figure 7:
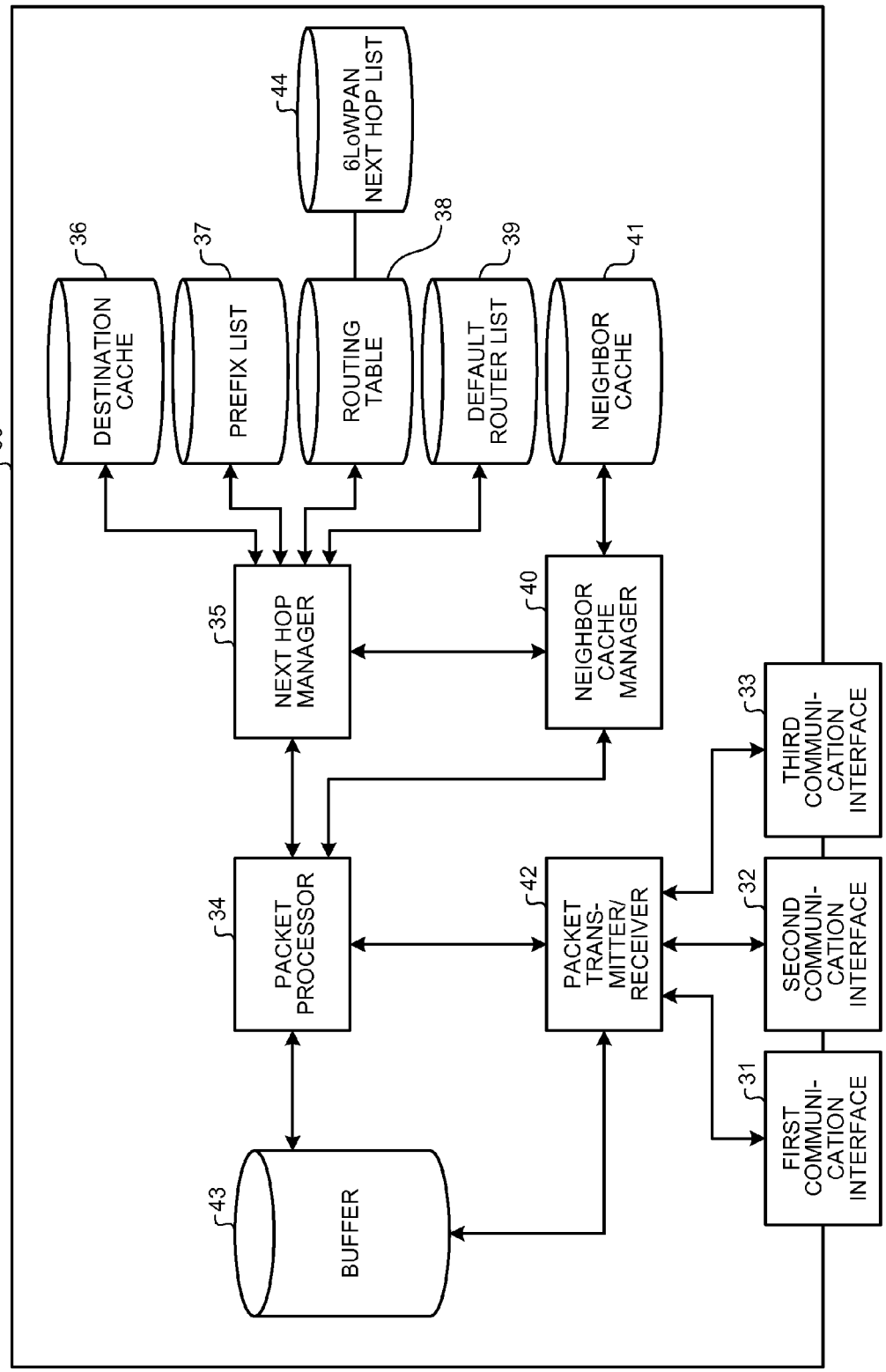
FIG. 7 is a diagram showing an exemplary hardware configuration of a communication processor according to a second embodiment of the present invention.

A second embodiment will be described here. Descriptions common with those of the first embodiment will not be given. FIG. 7 is a diagram showing an exemplary hardware configuration of the communication processor 30 according to the second embodiment. As shown in FIG. 7, the communication processor 30 further includes a 6LoWPAN next hop list 44. The 6LoWPAN next hop list 44 stores each of multiple indices that can be expressed by the number of bits smaller than that of multiple bits configuring a next hop address in association with a next hop address for 6LoWPAN. According to this example, the 6LoWPAN next hop list 44 corresponds to the "sixth storage" according to the claims. According to the second embodiment, the routing table 38 stores each destination address for 6LoWPAN in association with an index.

Figures 8, 9:
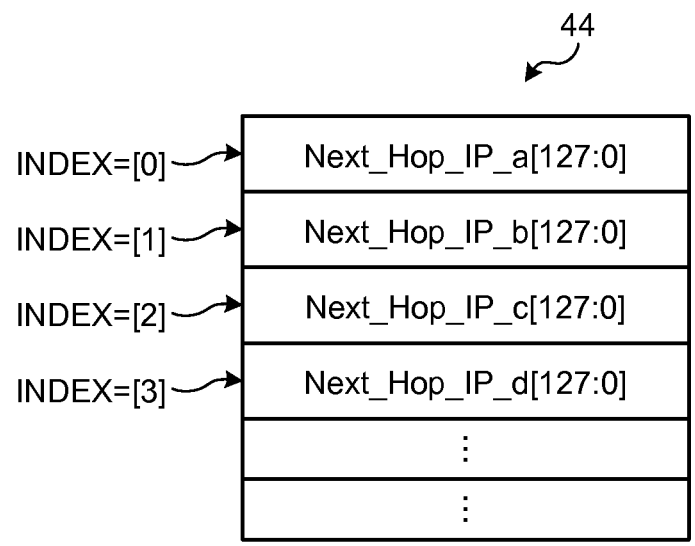
FIG. 8 is a schematic view representing a field corresponding to a next hop address for 6LoWPAN in a routing table according to a comparison example.
FIG. 9 is a diagram showing an exemplary next hop list for 6LoWPAN.

FIG. 8 is a schematic view representing a field corresponding to a next hop address for 6LoWPAN in the routing table 38 (that may be referred to as the "next hop field"). According to the example shown in FIG. 8, lower n bits (8 bits according to the example shown in FIG. 8) are regarded as an index. As shown in FIG. 9, the 6LoWPAN next hop list 44 stores each of 256 indices (index "0" to index "255") corresponding respectively to "0" to "255" in decimal that can be expressed by 8 bits in association with a next hop address for 6LoWPAN.

According to the second embodiment, when determining a next hop address for 6LoWPAN (a next hop address with respect to a destination address corresponding to a transmission packet for 6LoWPAN), the next hop manager 35 searches the routing table 38 and, when there is a hit of a destination address matching the destination address of the transmission packet for 6LoWPAN (a first transmission packet), specifies an index corresponding to the destination address, refers to the 6LoWPAN next hop list 44, and determines a next hop address associated with the specified index as a next hop address with respect to the destination address corresponding to the first transmission packet.

Figure 10:
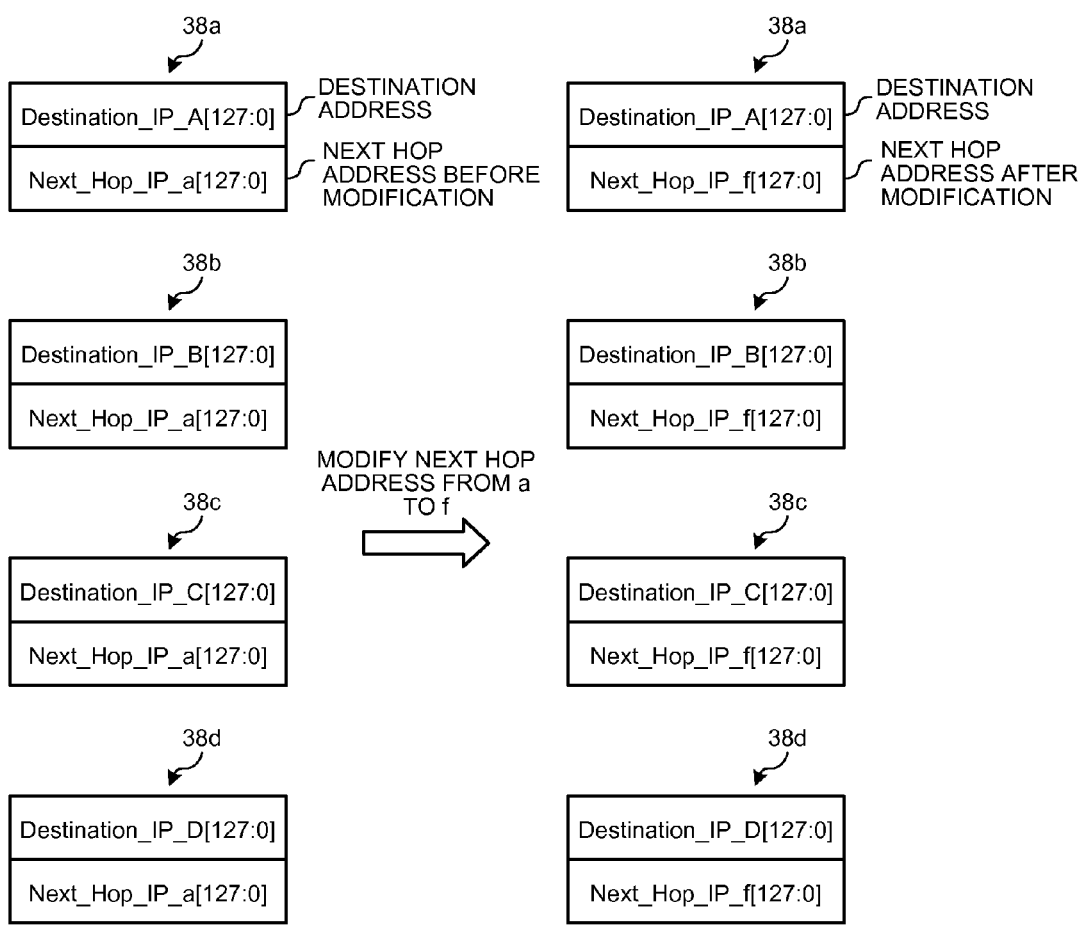
FIG. 10 is a schematic view for explaining exemplary modifying of a routing table in a contrast example.

As a comparison example, as shown in FIG. 10, a configuration is assumed in which each of multiple (four) routing tables 38a to 38d each of which stores at least a destination address and a next hop address in association with each other. According to the example shown in FIG. 10, each of a destination address of Destination_IP_A[127:0] in the routing table 38a, a destination address of Destination_IP_B[127:0] in the routing table 38b, a destination address of Destination_IP_C[127:0] in the routing table 38c, and a destination address of Destination_IP_D[127:0] in the routing table 38d is commonly associated with a next hop address of Next_Hop_IP_a[127:0].

According to the comparison example, for example, when the next hop address commonly corresponding to each of the destination address of Destination_IP_A[127:0] in the routing table 38a, the destination address of Destination_IP_B [127:0] in the routing table 38b, the destination address of Destination_IP_C[127:0] in the routing table 38c, and the destination address of Destination_IP_D[127:0] in the routing table 38d changes from Next_Hop_IP_a[127:0] to Next_Hop_IP_f[127:0], it is necessary to modify all the four hop fields corresponding to the four addresses respectively.

Figure 11:
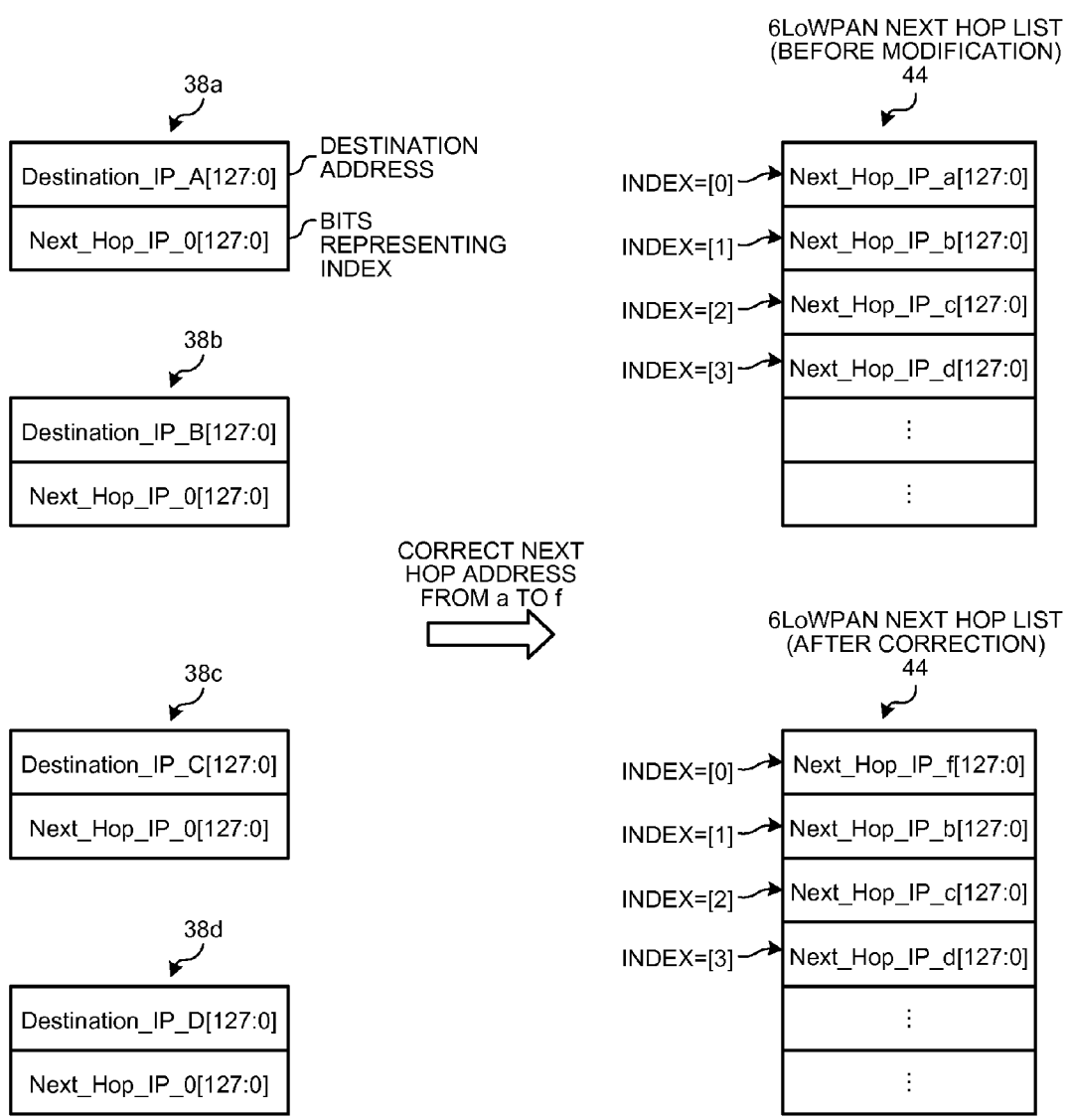
FIG. 11 is a schematic view for explaining an exemplary modifying of a routing table according to the second embodiment.

On the contrary, according to the second embodiment, as shown in FIG. 11, multiple (four) routing tables 38a to 38d each of which stores at least a destination address and a set of multiple bits expressing an index in association with each other are provided, and the 6LoWPAN next hop list 44 that stores each of multiple indices and a next hop address in association with each other are provided.

According to the example shown in FIG. 11, each of the destination address of Destination_IP_A[127:0] in the routing table 38a, the destination address of Destination_IP_B [127:0] in the routing table 38b, the destination address of Destination_IP_C[127:0] in the routing table 38c, and the destination address of Destination_IP_D[127:0] in the routing table 38d is commonly associated with Next_Hop_IP_0 [127:0]. Before modification, Next_Hop_IP_a[127:0] is associated as a next hop address corresponding to an index of "0" in the 6LoWPAN next hop list 44. In other words, it can be considered that a next hop address of Next_Hop_IP_a [127:0] is commonly associated with each of the destination address of Destination_IP_A[127:0] in the routing table 38a, the destination address of Destination_IP_B[127:0] in the routing table 38b, the destination address of Destination_IP_C[127:0] in the routing table 38c, and the destination address of Destination_IP_D[127:0].

According to the second embodiment, when the next hop address commonly corresponding to each of the destination address of Destination_IP_A[127:0] in the routing table 38a, the destination address of Destination_IP_B[127:0] in the routing table 38b, the destination address of Destination_IP_C[127:0] in the routing table 38c, and the destination address of Destination_IP_D[127:0] changes from Next_Hop_IP_a[127:0] to Next_Hop_IP_f[127:0], because it suffices if the single next hop address corresponding to the index "0" in the 6LoWPAN next hop list 44 is only modified from Next_Hop_IP_a[127:0] to Next_Hop_IP_f[127:0], it is possible to reduce the processing load of the CPU compared to the comparison example.

According to the second embodiment, as shown in FIG. 11, the 6LoWPAN next hop list 44 is provided separately from the routing table 38. Alternatively, for example, a mode may be employed where the routing table 38 is configured to include the 6LoWPAN next hop list 44.

The program executed by the above-described communication apparatus 1 may be configured to be recorded in a computer-readable recording medium, such as a CD-ROM, a flexible disk (FD), a CD-R, a digital versatile disk (DVD), or a universal serial bus (USB), and provided, or may be configured to be provided or distributed via a network, such as the Internet. Furthermore, various programs may be configured to be previously incorporated in a non-volatile recording medium, such as a ROM, and provided.

According to the embodiments of the present invention, it is possible to prevent a packet not for 6LoWPAN from being transmitted to a router for 6LoWPAN.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication apparatus including a plurality of communication interfaces, the communication apparatus comprising:
   at least one memory configured to store at least,
      a routing table configured to store at least a destination address representing an IPv6 address that is a destination of a packet and a next hop address representing an IPv6 address of a next hop representing the next destination to which the packet is transferred in association with each other;
      a default router list configured to store an IPv6 address of a default router to which the packet is transferred when it is not possible to determine the next hop address by using the routing table;
      a destination cache; and
      a prefix list configured to store at least a prefix of a link local address; and
   at least one processor configured to execute computer-readable instructions such that the at least one processor,
      upon a first router advertisement packet for IPv6 over Low Power Wireless Personal Area Networks (6LoWPAN) being received, registers an IPv6 address from which the first router advertisement packet has been transmitted as a next hop address in the routing table, and does not register the IPv6 address from which the first router advertisement packet has been transmitted as an IPv6 address of a default router in the default router list;
      upon a second router advertisement packet not for 6LoWPAN being received, registers an IPv6 address from which the second router advertisement packet has been transmitted as an IPv6 address of a default router in the default router list; and
   determines a next hop address with respect to a destination address corresponding to a transmission packet, wherein the at least one processor,
      in response to the transmission packet being a first transmission packet for 6LoWPAN, determines the next hop address with respect to the destination address corresponding to the first transmission packet by using the routing table, and
      in response to the transmission packet being a second transmission packet not for 6LoWPAN, determines the next hop address with respect to the destination address corresponding to the second transmission packet by using one of (i) the destination cache, (ii) the prefix list when it is not possible to determine the next hop address by using the destination cache, (iii) the routing table when it is not possible to determine the next hop address by using the prefix list, and (iv) the default router list when it is not possible to determine the next hop address by using the routing table.

2. The communication apparatus according to claim 1, wherein the at least one processor is configured to execute the computer-readable instructions such that the at least one processor generates the transmission packet.

3. The communication apparatus according to claim 1, wherein, each time the next hop address with respect to the destination address corresponding to the second transmission packet that is not for 6LoWPAN is determined, the at least one processor stores, in the destination cache, the destination address corresponding to the second transmission packet and the determined next hop address in association with each other.

4. The communication apparatus according to claim 3, wherein,
   the at least one processor determines the next hop address associated with the destination address that matches the destination address corresponding to the second transmission packet as the next hop address with respect to the destination address corresponding to the second transmission packet when the destination address matching the destination address corresponding to the second transmission packet is in the destination cache, and
   the at least one processor determines the next hop address with respect to the destination address corresponding to the second transmission packet by using the prefix list when the destination address matching the destination address corresponding to the second transmission packet is not in the destination cache.

5. The communication apparatus according to claim 4, wherein,
   the at least one processor determines the destination address corresponding to the second transmission packet as the next hop address when a prefix for identifying a network that is contained in the destination address corresponding to the second transmission packet and a prefix stored in the prefix list match each other and an On-Link flag representing that a prefix is on a link is set with respect to the prefix stored in the prefix list, and
   the at least one processor determines the next hop address with respect to the destination address corresponding to the second transmission packet by using the routing table when the prefix contained in the destination address corresponding to the second transmission packet and the prefix stored in the prefix list do not match, or when the On-Link flag is not set.

6. The communication apparatus according to claim 5, wherein,
   the at least one processor determines the next hop address associated with the destination address matching the destination address corresponding to the second transmission packet as the next hop address with respect to the destination address corresponding to the second transmission packet when the destination address matching the destination address corresponding to the second transmission packet is in the routing table, and
   the at least one processor determines an IPv6 address of the default router stored in the default router list as the next hop address with respect to the destination address corresponding to the second transmission packet when the destination address matching the destination address corresponding to the second transmission packet is not in the routing table.

7. The communication apparatus according to claim 1, wherein the at least one processor refers to the routing table and determines the next hop address associated with the destination address matching the destination address corresponding to the first transmission packet as the next hop address with respect to the destination address corresponding to the first transmission packet.

8. The communication apparatus according to claim 1, wherein:
   the at least one memory is further configured to store a neighbor cache configured to store at least an IPv6 address and a link layer address in association with each other; and the at least one processor is further configured to execute the computer-readable instructions such that the at least one processor, upon the first router advertisement packet for 6LoWPAN being received, registers at least an IPv6 address from which the first router advertisement packet has been transmitted and a link layer address from which the first router advertisement packet has been transmitted in association with each other in the neighbor cache, and upon the second router advertisement packet not for 6LoWPAN being received, registers at least an IPv6 address from which the second router advertisement packet has been transmitted and a link layer address from which the second router advertisement packet has been transmitted in association with each other in the neighbor cache;

upon the next hop address with respect to the destination address corresponding to the transmission packet being determined, refers to the neighbor cache and determines a link layer address associated with an IPv6 address matching the determined next hop address; and performs control to transmit the transmission packet by using the determined link layer address.

9. The communication apparatus according to claim 1, wherein the at least one memory is further configured to store a 6LoWPAN next hop list configured to store each of multiple indices that can be expressed by a number of bits smaller than that of a plurality of bits configuring the next hop address in association with the next hop address for 6LoWPAN, wherein the routing table is configured to store each destination address for 6LoWPAN in association with a plurality of bits that represent an index.

10. The communication apparatus according to claim 9, wherein the routing table includes the 6LoWPAN next hop list.

11. A communication method comprising:

upon a first router advertisement packet for IPv6 over Low Power Wireless Personal Area Network (6LoWPAN) being received, registering, in a routing table configured to store at least a destination address representing an IPv6 address that is a destination of a packet and a next hop address representing an IPv6 address of a next hop representing the next destination to which the packet is transferred in association with each other, an IPv6 address from which the first router advertisement packet has been transmitted as a next hop address, and not registering, in a default router list configured to store an IPv6 address of a default router to which the packet is transferred when it is not possible to determine the next hop address by using the routing table, the IPv6 address from which the first router advertisement packet has been transmitted as an IPv6 address of a default router;

upon a second router advertisement packet not for 6LoWPAN being received, registering, in the default router list, an IPv6 address from which the second router advertisement packet has been transmitted as an IPv6 address of a default router; and determining a next hop address with respect to a destination address corresponding to a transmission packet, wherein the determining includes, in response to the transmission packet being a first transmission packet for 6LoWPAN, determining the next hop address with respect to the destination address corresponding to the first transmission packet by using the routing table, and in response to the transmission packet being a second transmission packet not for 6LoWPAN, determining the next hop address with respect to the destination address corresponding to the second transmission packet by using one of (i) a destination cache, (ii) a prefix list configured to store at least a prefix of a link local address, when it is not possible to determine the next hop address by using the destination cache, (iii) the routing table when it is not possible to determine the next hop address by using the prefix list, and (iv) the default router list when it is not possible to determine the next hop address by using the routing table.

12. The communication method according to claim 11, further comprising, each time the next hop address with respect to the destination address corresponding to the second transmission packet that is not for 6LoWPAN is determined, storing, in the destination cache, the destination address corresponding to the second transmission packet and the determined next hop address in association with each other.

13. The communication method according to claim 12, wherein the determining includes:

determining the next hop address associated with the destination address that matches the destination address corresponding to the second transmission packet as the next hop address with respect to the destination address corresponding to the second transmission packet when the destination address matching the destination address corresponding to the second transmission packet is in the destination cache;

determining the next hop address with respect to the destination address corresponding to the second transmission packet by using the prefix list when the destination address matching the destination address corresponding to the second transmission packet is not in the destination cache;

determining the destination address corresponding to the second transmission packet as the next hop address when a prefix for identifying a network that is contained in the destination address corresponding to the second transmission packet and a prefix stored in the prefix list match each other and an On-Link flag representing that a prefix is on a link is set with respect to the prefix stored in the prefix list;

determining the next hop address with respect to the destination address corresponding to the second transmission packet by using the routing table when the prefix contained in the destination address corresponding to the second transmission packet and the prefix stored in the prefix list do not match, or when the On-Link flag is not set;

determining the next hop address associated with the destination address matching the destination address corresponding to the second transmission packet as the next hop address with respect to the destination address corresponding to the second transmission packet when the destination address matching the destination address corresponding to the second transmission packet is in the routing table; and determining an IPv6 address of the default router stored in the default router list as the next hop address with respect to the destination address corresponding to the second transmission packet when the destination address matching the destination address corresponding to the second transmission packet is not in the routing table.

14. The communication method according to claim 11, wherein the determining includes referring to the routing table and determining the next hop address associated with the destination address matching the destination address corresponding to the first transmission packet as the next hop address with respect to the destination address corresponding to the first transmission packet.

15. The communication method according to claim 11, further comprising:
   upon the first router advertisement packet for 6LoWPAN being received, registering, in a neighbor cache configured to store at least an IPv6 address and a link layer address in association with each other, at least an IPv6 address from which the first router advertisement packet has been transmitted and a link layer address from which the first router advertisement packet has been transmitted in association with each other;
   upon the second router advertisement packet not for 6LoWPAN being received, registering, in the neighbor cache, at least an IPv6 address from which the second router advertisement packet has been transmitted and a link layer address from which the second router advertisement packet has been transmitted in association with each other;
   upon the next hop address with respect to the destination address corresponding to the transmission packet being determined, referring to the neighbor cache and determining a link layer address associated with an IPv6 address matching the determined next hop address; and
   performing control to transmit the transmission packet by using the determined link layer address.

16. A non-transitory computer-readable recording medium that contains a computer program that, when executed, causes a computer to:
   upon a first router advertisement packet for IPv6 over Low Power Wireless Personal Area Network (6LoWPAN) being received,
      register, in a routing table configured to store at least a destination address representing an IPv6 address that is a destination of a packet and a next hop address representing an IPv6 address of a next hop representing the next destination to which the packet is transferred in association with each other, an IPv6 address from which the first router advertisement packet has been transmitted as a next hop address, and
      not register, in a default router list configured to store an IPv6 address of a default router to which the packet is transferred when it is not possible to determine the next hop address by using the routing table, the IPv6 address from which the first router advertisement packet has been transmitted as an IPv6 address of a default router;
   upon a second router advertisement packet not for 6LoWPAN being received, register, in the default router list, an IPv6 address from which the second router advertisement packet has been transmitted as an IPv6 address of a default router; and
   determine a next hop address with respect to a destination address corresponding to a transmission packet, including,
      in response to the transmission packet being a first transmission packet for 6LoWPAN, determining the next hop address with respect to the destination address corresponding to the first transmission packet by using the routing table, and
      in response to the transmission packet being a second transmission packet not for 6LoWPAN, determining the next hop address with respect to the destination address corresponding to the second transmission packet by using one of (i) a destination cache, (ii) a prefix list configured to store at least a prefix of a link local address, when it is not possible to determine the next hop address by using the destination cache, (iii) the routing table when it is not possible to determine the next hop address by using the prefix list, and (iv) the default router list when it is not possible to determine the next hop address by using the routing table.

17. The non-transitory computer-readable recording medium according to claim 16, wherein, each time the next hop address with respect to the destination address corresponding to the second transmission packet that is not for 6LoWPAN is determined, the computer stores, in the destination cache, the destination address corresponding to the second transmission packet and the determined next hop address in association with each other.

18. The non-transitory computer-readable recording medium according to claim 17, wherein executing the computer program causes the computer to:
   determine the next hop address associated with the destination address that matches the destination address corresponding to the second transmission packet as the next hop address with respect to the destination address corresponding to the second transmission packet when the destination address matching the destination address corresponding to the second transmission packet is in the destination cache;
   determine the next hop address with respect to the destination address corresponding to the second transmission packet by using the prefix list when the destination address matching the destination address corresponding to the second transmission packet is not in the destination cache;
   determine the destination address corresponding to the second transmission packet as the next hop address when a prefix for identifying a network that is contained in the destination address corresponding to the second transmission packet and a prefix stored in the prefix list match each other and an On-Link flag representing that a prefix is on a link is set with respect to the prefix stored in the prefix list;
   determine the next hop address with respect to the destination address corresponding to the second transmission packet by using the routing table when the prefix contained in the destination address corresponding to the second transmission packet and the prefix stored in the prefix list do not match, or when the On-Link flag is not set;
   determine the next hop address associated with the destination address matching the destination address corresponding to the second transmission packet as the next hop address with respect to the destination address corresponding to the second transmission packet when the destination address matching the destination address corresponding to the second transmission packet is in the routing table; and determine an IPv6 address of the default router stored in the default router list as the next hop address with respect to the destination address corresponding to the second transmission packet when the destination address matching the destination address corresponding to the second transmission packet is not in the routing table.

19. The non-transitory computer-readable recording medium according to claim 16, wherein executing the computer program causes the computer to refer to the routing table and determine the next hop address associated with the destination address matching the destination address corresponding to the first transmission packet as the next hop address with respect to the destination address corresponding to the first transmission packet.

20. The non-transitory computer-readable recording medium according to claim 16, wherein executing the computer program causes the computer to:

upon the first router advertisement packet for 6LoWPAN being received, register, in a neighbor cache configured to store at least an IPv6 address and a link layer address in association with each other, at least an IPv6 address from which the first router advertisement packet has been transmitted and a link layer address from which the first router advertisement packet has been transmitted in association with each other;

upon the second router advertisement packet not for 6LoWPAN being received, register, in the neighbor cache, at least an IPv6 address from which the second router advertisement packet has been transmitted and a link layer address from which the second router advertisement packet has been transmitted in association with each other;

upon the next hop address with respect to the destination address corresponding to the transmission packet being determined, refer to the neighbor cache and determine a link layer address associated with an IPv6 address matching the determined next hop address; and perform control to transmit the transmission packet by using the determined link layer address.

* * * * *